United States Patent [19]
Chambers

[11] Patent Number: 5,382,069
[45] Date of Patent: * Jan. 17, 1995

[54] HIDEAWAY DOOR FOR TRUCK BEDS

[76] Inventor: Mark D. Chambers, 5307 N. 32nd Pl., Phoenix, Ariz. 85018

[*] Notice: The portion of the term of this patent subsequent to Apr. 17, 2010 has been disclaimed.

[21] Appl. No.: 844,215

[22] Filed: Mar. 2, 1992

[51] Int. Cl.$^6$ .............................. B60R 11/00
[52] U.S. Cl. .................... 296/37.6; 296/37.1; 224/42.42
[58] Field of Search ............ 296/37.6, 37.1, 24.1; 224/42.42

[56] References Cited

U.S. PATENT DOCUMENTS

| | | | |
|---|---|---|---|
| 2,019,674 | 11/1935 | Graebner | 296/37.13 |
| 4,451,075 | 5/1984 | Canfield | 296/37.6 |
| 4,506,870 | 3/1985 | Penn | 296/37.6 X |
| 4,580,827 | 4/1986 | Feagan | 296/37.6 |
| 4,789,195 | 12/1988 | Fletcher | 296/37.6 |
| 4,884,838 | 12/1989 | Slater | 296/24.1 X |
| 5,088,636 | 2/1992 | Barajas | 296/37.6 X |

*Primary Examiner*—Joseph Pape
*Attorney, Agent, or Firm*—Gregory J. Nelson

[57] ABSTRACT

A removable storage door for a pickup truck bed to provide additional storage space beneath the straddle toolbox extending between the truck bed side walls. The door is positioned below the tool box and is hinged either to the tool box or to the floor of the truck bed. Appropriate latches or fasteners are provided to lock the door. The door may be pivoted between an open position and a closed generally vertical position. The hinges are detachable so the door may be removed or, if the door is in place, present a low profile with the door in an open position against the truck bed.

7 Claims, 2 Drawing Sheets

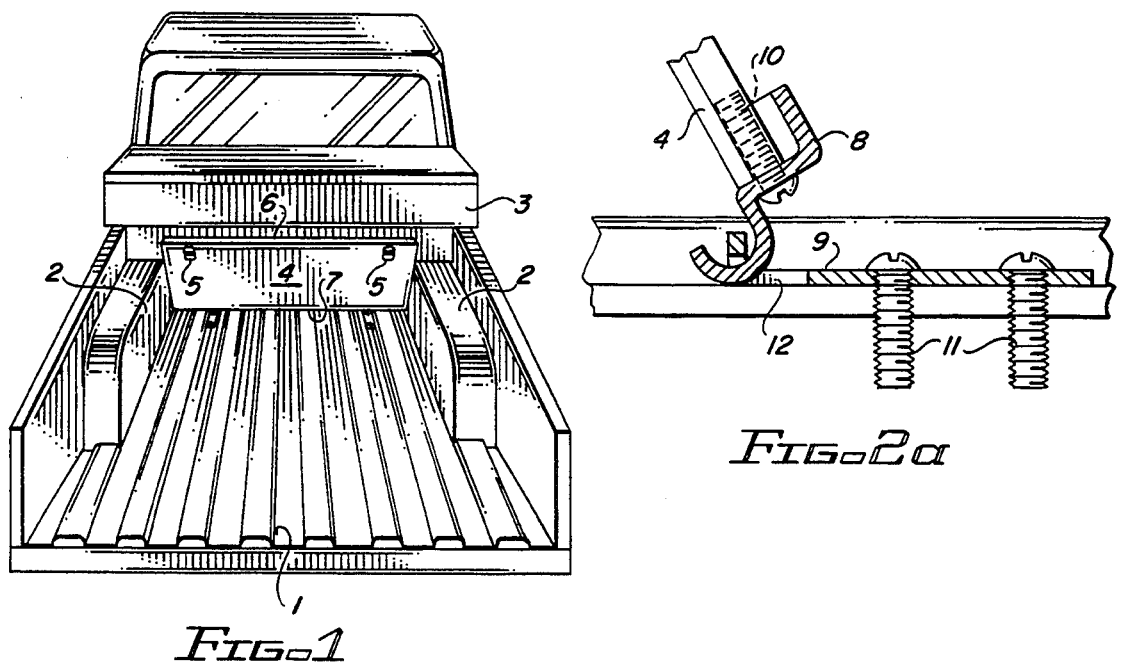
FIG-1
FIG-2a
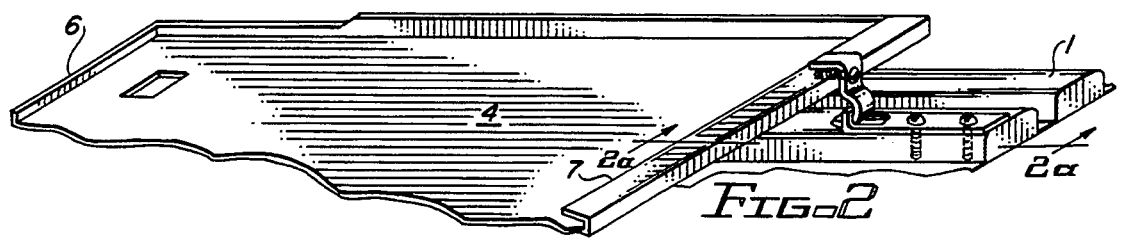
FIG-2
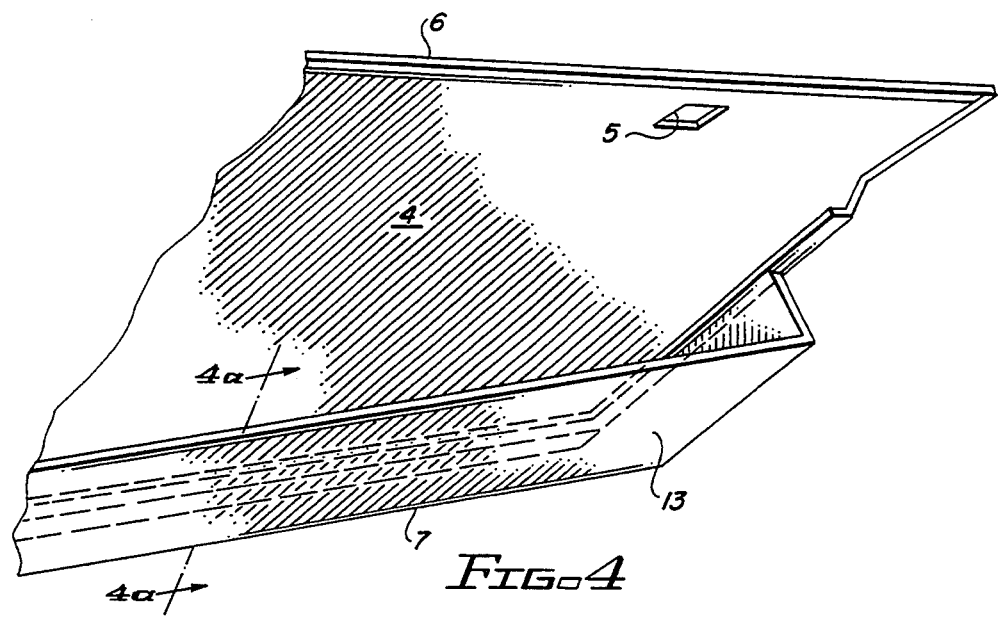
FIG-4

MODEL S-100 DOOR SPECIFICATIONS:
DOOR FITS:
    CHEVY S-10 SHORT, REGULAR & KING CAB BEDS
    DODGE RAM & DAKOTA SHORT, REGULAR & KING CAB BEDS
    FORD RANGER SHORT, REGULAR & KING CAB BEDS
    ISUZU SHORT, REGULAR & KING CAB BEDS
    NISSAN SHORT, REGULAR & KING CAB BEDS
    TOYOTA SHORT, REGULAR & KING CAB BEDS

MODEL S-200 DOOR SPECIFICATIONS:
DOOR FITS:
    CHEVY 1/2 & 3/4 SHORT BEDS
    DODGE 1/2 & 3/4 SHORT BEDS
    DODGE RAM & DAKOTA LONG BEDS
    FORD RANGER LONG BEDS
    FORD 1/2 & 3/4 SHORT BEDS
    JEEP 1/2 & 3/4 SHORT BEDS

MODEL S-300 DOOR SPECIFICATIONS:
DOOR FITS:
    NISSAN LONG BED
    CHEVY S-10 LONG BED
    TOYOTA LONG BED
    ISUZU LONG BED
    MAZDA LONG BED

MODEL S-400 DOOR SPECIFICATIONS:
DOOR FITS:
    CHEVY 1/2 & 3/4 REGULAR, LONG & KING CAB BEDS
    DODGE 1/2 & 3/4 REGULAR, LONG & KING CAB BEDS
    FORD 1/2 & 3/4 REGULAR, LONG & KING CAB BEDS
    JEEP 1/2 & 3/4 REGULAR, LONG & KING CAB BEDS

FIG. 3

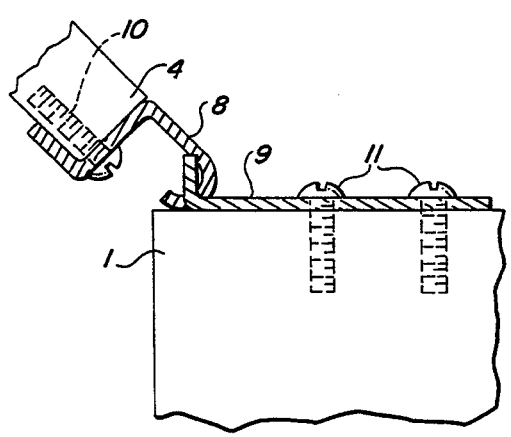

FIG. 4a

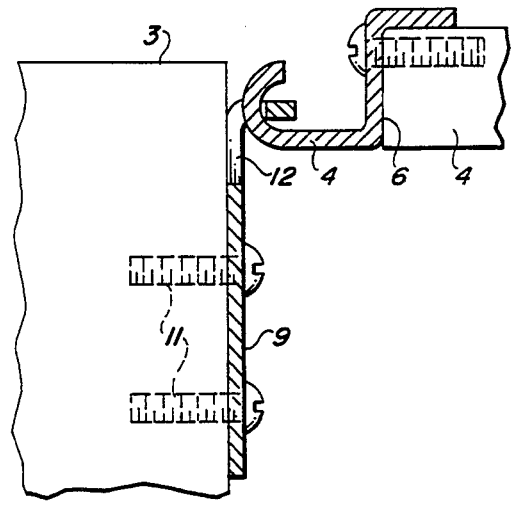

FIG. 5

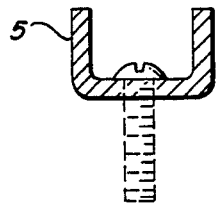

HIDEAWAY DOOR FOR TRUCK BEDS

This invention pertains to disclosure document No. 269727 filed Dec. 20, 1991 known as the "Space Saver Lock Door" which utilizes existing, available space under an installed existing pickup truck tool box, for the purpose of additional truck tool box type storage.

BACKGROUND OF THE INVENTION

It is a most frustrating situation to have several pieces of heavy expensive equipment in the back of your truck at lunch time and everyone is headed in to the restaurant—everyone but you, that is . . . Why is this? Because your truck tool box is too small for the sledge, 20' chain and 30 ton air jack. So you get out, go around and again begin your job of moving equipment from the back of the truck to the cab floor board. You see, we somehow feel safer is our thousand dollar air jack is on the floor of a locked cab in full sight rather than underneath out trustworty truck tool box and for good reason. Ask any journeyman carpenter whether he has had anything stolen out of the back of his truck and the answer will be a resounding yes. What was it stolen? Because there is not enough room to lock it up. With the present invention these items will slide beneath the truck tool box with room for many more items. That's storage. That's lock up power. All for a fraction of the price. What's more, with the flick of a key you can open the hideaway door and remove it instantly. With it's tin, rectangular shape, you can store it anywhere including inside the cab behind the seat. Alternatively, it may be fastened to the truck bed or tool box by linking arms.

The hideaway door will eventually work it's way into the market place and remain a stable, very creative and useful product—as long as they continue making truck tool boxes with a void space underneath. Why is there void space? Because we all need the full length of bed when hauling a load of 4'×8' plywood to the job site and who wants to unload a full, in line, truck tool box for a short haul? Nobody. Thus the need remains for this style truck tool box and as long as in demand, the hideaway door will be in demand too.

The hideaway door provides previously unused available space preexisting under an installed truck tool box, with lock up capabilities through minimal means of additional hardware rather than additional bulky tool boxes.

I have invented the hideaway door out of necessity, thus it is designed to provide less expensive additional lock up capacity for consumers without adding costly additional tool boxes. This invention will retail at less than half the cost of current truck tool boxes while supplying, in most instances, more total lock up volume capacity than said existing truck tool box. This is a pleasant surprise for even the most discriminating minds.

PRIOR ART

Prior art was not found on anything remotely resembling this invention. The following referenced classifications were searched without success: 70/DIG65 70/DIG34 70/164 224/42.42 224/273 224/328 296/37.6 312/DIG33

OBJECT OF THE INVENTION

It is, therefore, one of the objects of the invention to provide additional truck tool box capacity without bulky additions, and without shortening the length and utility of truck bed.

Another object is to provide variant styles of invention, i.e. the door may be hinged from the bed or truck to swing upwardly, or hinged from the tool box of truck to swing downwardly.

A further object of the invention is to provide variant models for consumer preference; model one with one latch or fastener mounted to said tool box or bed, (depending on style) for quick convenient accessibility, to be positioned in the top center portion of said tool box or bed, and another style with equally positioned latches or fasteners mounted to said tool box or bed, (depending on style) for optimal security, to be positioned in the respective top left and right corners of said tool box. Said models may be inverted for proper perspective.

Another object is to provide a more cost effective means for consumers to affording available lockup storage with a minimal amount of additional tool boxes or hardware.

A further object of the invention is to provide an instant remove/replace feature giving optimum performance of truck bed at a moments notice.

An additional object of the invention is to provide a low profile hinge/latch configuration design, (depending on style) to fit between the ribs in the said bed for easy glide of materials over top of installed hinge/latch portion, when the door member hinge/latch portion is removed.

Another object is to provide an optional tray on inside wall of said door member for more convenient additional storage.

An additional object of the invention is to provide a series of hideaway doors to accommodate every pickup truck manufactured.

BRIEF DESCRIPTION OF THE FIGURES OF THE DRAWINGS

FIG. 1 is a perspective view with a pickup truck with a tool box, and of the present invention mounted thereto, including a pair of latches and key ways indicated at the top edge of the door member, which is hinged at the bottom edge of the door member;

FIG. 2 is an open door view of a door member of the present invention mounted in a truck bed with a latch and key way adjacent the top edge of the door portion and break away hinge joint at the bottom portion of the door member;

FIG. 2-A is an enlarged view of the hinge portion of the door member in the area enclosed in a circle on FIG. 2 taken in the direction indicated by the line 2-A—2-A of FIG. 2;

FIG. 3 is a plurality of tables comprising a series of four charts that illustrate four models of the present invention and the various truck models that each model will fit showing the wide diversity of truck models that may be fitted by the present invention;

FIG. 4 is a perspective view of a the present invention with a hinge portion near its bottom edge and a key way and latch near its top edge and illustrating a preferred embodiment of an interior pocket for additional storage on the interior of the door member;

FIG. 4-A is an enlarged view of the hinge portion of the door member in the area enclosed in a circle on FIG. 4 taken in the direction indicated by the line 4-A—4-A of FIG. 4; and FIG. 5 is an enlarged view of portions of a hinge mechanism to be located at the top edge of the door member and a portion of a cooperating latch mechanism for the bottom edge portion of the door latch member, said latch being illustrated in the truck bed area.

DETAILED DESCRIPTION OF THE INVENTION

FIG. 1 is a view from the rear end of a miniature pickup truck bed 1 in which wells 2 are indicated on the side of the bed which. The number 3 indicates an installed tool box in the bed of the truck. Extending vertically from a location near the bottom of the tool box 3 to the truck bed is a door member 4, which may be hinged at its top edge 6 to the tool box or at bottom edge 7 to the truck bed so that it may be extended outward horizontally and swung closed to a vertical position with its bottom edge adjacent the truck bed where the door member 4 may be latched and locked so that only a key-way may be seen.

In FIG. 1 the truck bed 1 is shown as ridged. This allows the latch and lock mechanism to be disposed in between adjacent ridges where it will not interfere with the usage of the upper portion of surface of the truck bed and allow loading or unloading (wide sheet material, for example) into the space beneath the tool box 3 when the door 4 is open or removed as will be described later.

It will be seen from FIG. 1 that the present invention thus provides a convenient way to lock tools or other items in the space beneath the installed tool chest 3. Thus the owner of a valuable tool may go to lunch with the other members of his crew knowing that his tool is locked in a secure and hidden place.

For this reason the door member 4 is made of a reasonably rigid material, such as metal or rigid plastic to provide the security of the space it encloses. In the form of the invention shown in FIG. 1 the door member 4 is hinged at its bottom edge and the numerals 5 indicate a latch and lock mechanism to secure the door member 4 to the tool chest 3 which is also securely mounted to the truck. The door member 4 may also be hinged at its top edge 6 with one or more latch and lock mechanisms disposed near the top edge adjacent a vertical side of the tool chest 3, as preferred by the user. In this form the truck bed and its ridges are clear for free loading and unloading of cargo even in the space beneath the tool chest 3.

In the form of the invention shown in FIG. 1, 2, and 5 the door member is hinged at its bottom edge 7. It may be desirable to use detachably hinge in order to be able to remove the door member 4 from the truck bed to prevent interference with loading or unloading operations. In this care the door member 4 may be placed in the cab of the truck until it is to be mounted to enclose the storage space beneath the tool chest 3. In FIG. 2 and 2A a form a detachable hinge is shown and includes a hinge strap 8 and another hinge strap 9. The strap 9 has an aperture 12 there-through so that a curved portion of the strap 8 may be passed through the aperture 12 and the two straps 8 and 9 may act like a hinge. Obviously many other forms of detachable hinges are available and can be used in the present invention. The form shown in the drawings has simplicity as its advantage. It is of course cost effective if that is a consideration in the manufacture and sale of the present invention. If it is desired that this door member 4 remain affixed, the hinge may be of the fixed type and a pair of transversely spaced, pivotally mounted straps may be mounted between the two hinged members so that this door member 4 will remain attached and not be subject to being misplaced.

FIG. 4 illustrates another variant feature of the invention which some users will desire. The door member 4 is provided with an internal pocket by securing a pocket wall 13 to the interior of the door member 4 to provide an additional storage space next to the door member 4. When the door member is closed against the space beneath the tool chest 3 a storage space adjacent the door is provided for appropriate items, and such items have the security that the latch and lock add to the construction.

In summation it is believed that the present invention provides a number of features that are advantageous is a truck having an installed tool chest without adding a substantial number of parts or substantial weight to the truck. Further, the invention adds usefulness to the truck without adding a lot of cost to be borne by the truck user.

It is to be understood that the invention is not limited to the specific embodiment illustrated, but includes other embodiments within the scope of the appended claims, together with modifications, substitution of equivalents, and the like, to the extent that such would be obvious to a person of ordinary skill.

What is claimed is:

1. In a truck of the type having a cab with a bed located behind the cab, said truck bed having a floor and side wall panels with a tool box extending between the side walls, a storage compartment comprising:
    (a) a door panel having top, bottom and opposite sides positionable below the tool box in a closed, generally vertical position with the door extending between the side walls and between the floor and bottom of the tool box;
    (b) detachable hinge members attached to said panel and one of said tool box or said truck bed floor, said hinge members having a first hinge strap having an aperture therein and a second hinge member engageable in said aperture whereby said door may be pivoted between said closed position and an open position disposed against said bed floor and whereby said door may be selectively detached from said truck at said hinge members; and
    (c) latch means associated with said door and the other of said tool box and truck bed floor for selectively securing said door in said closed position.

2. The storage compartment of claim 1 wherein said truck bed floor includes longitudinally extending spaced-apart ribs and wherein said one of said hinge members is disposed on the bottom side of said door and the other of said hinge members is disposed between selected of said ribs.

3. The storage compartment of claim 2 including a pair of spaced-apart hinge members.

4. The storage compartment of claim 1 wherein said door is provided with a storage pocket on a side thereof.

5. The storage compartment of claim 1 wherein said door is a rigid panel having a generally U-shaped frame extending along said bottom side.

6. The storage compartment of claim 1 wherein said latch means includes key-actuated locking means.

7. The storage compartment of claim 2 wherein said first hinge member has an upstanding projection wherein said first hinge strap is secured to said truck bed within said storage area and wherein said second hinge member has a hook member.

* * * * *